March 27, 1928.
A. P. BRUSH
1,663,647
ENERGY STORAGE UNIT
Filed Feb. 7, 1927
2 Sheets-Sheet 1
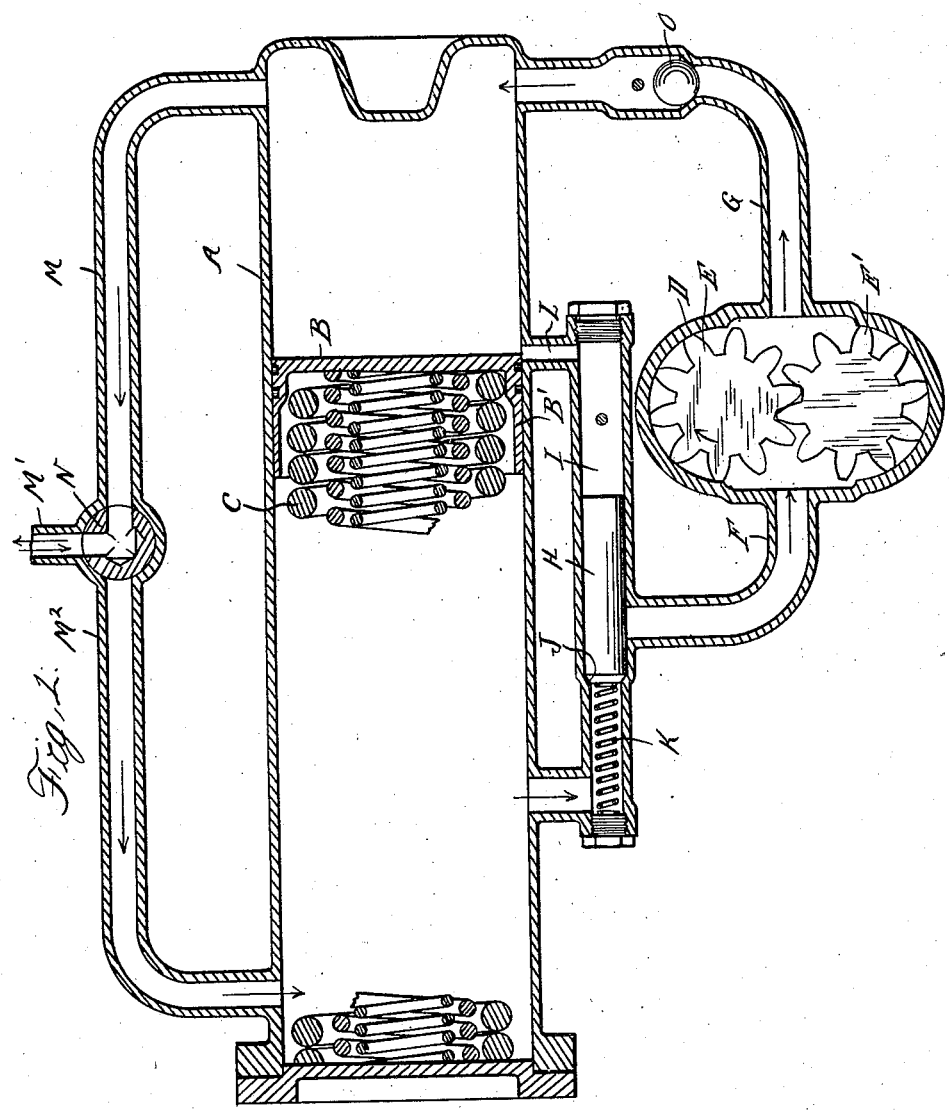
Inventor
Alanson P. Brush

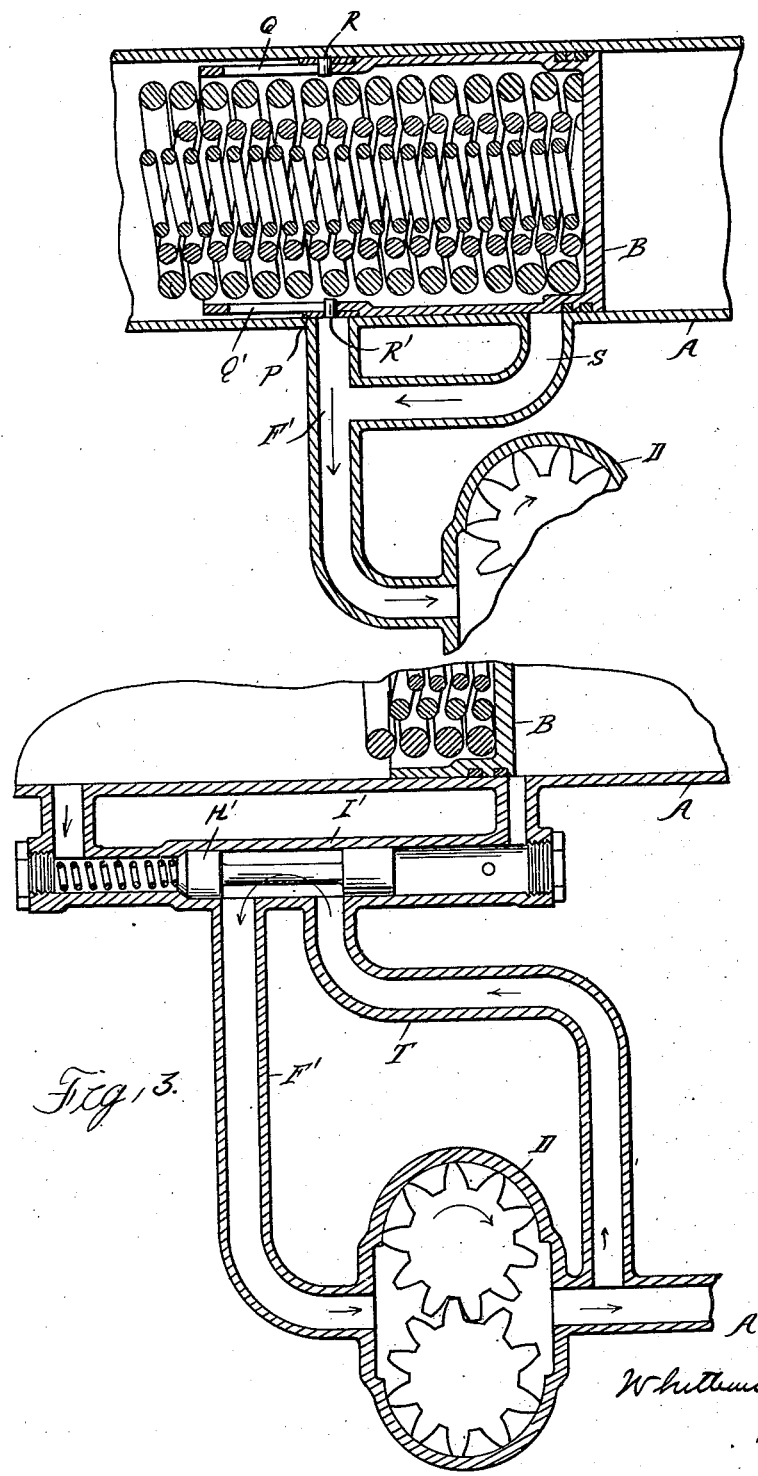

Patented Mar. 27, 1928.

1,663,647

UNITED STATES PATENT OFFICE.

ALANSON P. BRUSH, OF DETROIT, MICHIGAN.

ENERGY-STORAGE UNIT.

Application filed February 7, 1927. Serial No. 166,566.

The invention relates to apparatus designed for storage of power and of that type in which a fluid is displaced by a pump against resilient resistance until a predetermined maximum pressure head is attained. It is usual with such constructions to provide automatically operated means for stopping the pump on the attainment of such maximum pressure which is accomplished either by mechanically disconnecting it from its source of power or by short circuiting the pump. In the former case a clutch is required together with means for throwing it out and in respectively at high and low pressure limits. With the other construction the fluid is continuously displaced but travels through an endless circuit when not storing energy.

It is the object of the present invention to obtain a simplified construction of energy storage unit dispensing with the use of any mechanical clutch and permitting the driven parts to move continuously. At the same time provision is made for limiting the storage of energy and for avoiding the displacement of fluid while no energy is being stored. To this end the invention consists in the construction as hereinafter set forth.

In the drawings;

Figure 1 is a central longitudinal section through my improved unit.

Figure 2 is a similar view showing a modified form of control, and

Figure 3 is a similar view showing another modification.

As shown in Figure 1 A is a cylinder containing a piston B which is urged toward one end of the cylinder by the resilient pressure of a spring C. D is a fluid displacement pump specifically shown as comprising the intermeshing gears E, E' within a casing which is connected on one side of said gears with the inlet conduit F and on the other side with the outlet conduit G. The conduit F is connected with the cylinder A on the spring side of the piston while the conduit G is connected to the opposite end of the cylinder. Thus fluid displaced by the pump will force the piston B rearward against the resistance of the spring C which constantly increases in tension until the maximum limit is reached.

To limit the energy stored the inlet conduit F is closed thereby cutting off supply to the pump and preventing further displacement. This as shown in Figure 1 is accomplished by a piston valve H operating in a cylinder I and having one end engageable with a seat J but normally held out of contact with said seat by a spring K. The opposite end of the piston B is exposed to the pressure of fluid in the cylinder I and at a predetermined point in the advancement of the piston B a port L is opened connecting the cylinder A with the cylinder I. Thus the pressure of fluid in the cylinder A acting upon the piston I will move the latter against its seat J thereby effectively closing the inlet F.

The energy stored may be utilized by the passage of the high pressure fluid in the cylinder A outward through a conduit M to any suitable motor device. As the fluid escapes from the cylinder the piston B will again cover the port L but the fluid in the cylinder I still remains under high pressure and will continue to hold the valve H closed. When however, the skirt B' of the piston completely passes the port L this will open communication with the low pressure side of the cylinder A whereupon the pressure in the cylinder I is relieved and the valve H is again opened by the action of the spring J.

With the construction as thus far described it will be understood that the pump D may continue its movement during the period in which the valve H is closed but without effecting any displacement of fluid after that in the inlet conduit F has been exhausted. There is, therefore, no necessity of any clutch or mechanism for operating the same. It is further evident that no displacement of fluid will occur while the piston B is moving outward under the actuation of the spring C until the skirt B' uncovers the port L and permits the valve H to open. Thus high pressure and low pressure limits may be selected and controlled by the piston B. The fluid passing through the conduit M may after performance of work be returned to the low pressure side of the cylinder A and as shown a three way valve N is used for this purpose. This valve in the position shown in Figure 1 connects the conduit M with the conduit M' leading to the motor and in a different position of adjustment will connect the conduit M' with the return conduit M². A check valve O in the conduit G will hold the pressure in the cylinder A preventing escape through the pump when the latter is unloaded.

The construction shown in Figure 2 is the same as that in Figure 1 with a modified form of valve for controlling the inlet to the pump. This valve is in the form of a ring P in the cylinder A controlling ports leading to the inlet conduit F'. It is actuated by a lost motion connection with the piston B which as shown, comprises the longitudinally slotted arms Q, Q' on opposite sides of the piston engaging pins R, R' in the valve ring. This will cause the closing of the ports by the valve P after the piston has moved to the position of maximum pressure head. The valve will remain in this position during the return movement of the piston B until a predetermined minimum head is reached whereupon the lost motion having been taken up the slotted arms Q, Q' will open the valve. In case the valve P should fail to operate or if for any other reason the fluid displacement should continue after the maximum pressure has been attained, a slightly further movement of the piston B will open a by-pass port S permitting the high pressure fluid to return to the low pressure side.

In the construction shown in Figure 3 the valve H' is similar to the valve H of Figure 1 but performs the additional function of short circuiting the pump D. This is accomplished by a by-pass conduit T leading from the pressure side of the pump to the valve cylinder I' and so arranged that in the closed position of said valve H' the conduit T will be connected with the inlet conduit F' of the pump. Thus the continued movement of the pump will merely pass the fluid through an unrestricted endless circuit thereby relieving said pump from load.

What I claim as my invention is:

1. The combination with a fluid storage cylinder, a piston therein and resilient means forming a progressively increasing resistance to the movement of said piston in one direction in said cylinder, of mechanically driven fluid displacement means having its discharge connected to said cylinder at the end toward which the piston is urged by said resilient means, the inlet to said displacement means being connected to said cylinder on the opposite side of the piston, a valve for controlling the inlet conduit and means automatically operated upon movement of said piston to a predetermined position for closing said valve.

2. The combination of a cylinder, a piston therein dividing said cylinder into high pressure and low pressure compartments, a spring located in the low pressure compartment for opposing movement of said piston in a direction to expand the high pressure compartment, mechanically driven fluid displacement means having its discharge connected to the high pressure compartment and its inlet to the low pressure compartment, a valve for closing said inlet, fluid actuating means for closing said valve and a connection between said fluid actuating means and said cylinder opened to the high pressure compartment upon the movement of said piston to a predetermined position in said cylinder.

3. The combination of a cylinder, a piston therein dividing said cylinder into high pressure and low pressure compartments, a spring located in the low pressure compartment for opposing movement of said piston in a direction to expand the high pressure compartment, mechanically driven fluid displacement means having its discharge connected to the high pressure compartment and its inlet to the low pressure compartment, a valve for closing said inlet, fluid actuating means for closing said valve and a connection between said fluid actuating means and said cylinder opened to said high pressure compartment when said piston is moved to a predetermined position in a direction to expand said compartment and opened to said low pressure compartment when said piston is moved in an opposite direction to a predetermined point in said cylinder.

4. The combination with a cylinder, of a piston therein dividing said cylinder into high pressure and low pressure compartments, a spring in said low pressure compartment for opposing movement of said piston in a direction to expand said high pressure compartment, a mechanically driven fluid pump having its outlet connected to said high pressure compartment and its inlet to said low pressure compartment, a check valve in the outlet for retaining the pressure of said high pressure compartment, a valve for closing the inlet, fluid pressure actuating means for closing said valve, a connection between said fluid actuating means and said cylinder controlled by said piston to be opened to said high pressure compartment upon a predetermined expansion thereof and opened to said low pressure compartment upon a predetermined contraction of said high pressure compartment, a conduit leading from said high pressure compartment to the means to be actuated by said fluid pressure and a return conduit from said means connected with said low pressure compartment.

5. The combination with a cylinder, of a piston therein dividing said cylinder into high pressure and low pressure compartments, a spring in said low pressure compartment for opposing movement of said piston in a direction to expand said high pressure compartment, a mechanically driven fluid pump having its outlet connected to said high pressure compartment and its inlet to said low pressure compartment, a check valve in the outlet for retaining the pressure of said high pressure compartment, a valve for closing the inlet, fluid pressure actuating means for closing said valve, a connection between said fluid actuating means and said cylinder controlled by said piston to be opened to said high pressure compartment upon a predetermined expansion thereof and opened to said low pressure compartment upon a predetermined contraction of said high pressure compartment, conduits leading respectively from said high pressure and low pressure compartments to a common service conduit, and a three-way valve controlling the connection between said conduits.

In testimony whereof I affix my signature.

ALANSON P. BRUSH.